(12) United States Patent
Chen et al.

(10) Patent No.: US 10,817,118 B2
(45) Date of Patent: Oct. 27, 2020

(54) DISPLAY TOUCH DEVICE

(71) Applicant: InnoLux Corporation, Miao-Li County (TW)

(72) Inventors: Po-Yang Chen, Miao-Li County (TW); Hsing-Yuan Hsu, Miao-Li County (TW); Kuei-Sheng Chang, Miao-Li County (TW); I-An Yao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/373,968

(22) Filed: Apr. 3, 2019

(65) Prior Publication Data

US 2019/0227654 A1    Jul. 25, 2019

Related U.S. Application Data

(62) Division of application No. 15/244,199, filed on Aug. 23, 2016, now abandoned.

(30) Foreign Application Priority Data

Aug. 24, 2015  (TW) .............................. 104127452 A

(51) Int. Cl.
*G06F 3/044*  (2006.01)
*G06F 3/041*  (2006.01)

(52) U.S. Cl.
CPC ............ *G06F 3/044* (2013.01); *G06F 3/0412* (2013.01); *G06F 3/0416* (2013.01); *G06F 2203/04111* (2013.01)

(58) Field of Classification Search
CPC ...... G06F 3/044; G06F 3/0412; G06F 3/0416; G06F 2203/04111
See application file for complete search history.

(56) References Cited

U.S. PATENT DOCUMENTS 8,599,165 B2  12/2013  Westhues et al.
2011/0260741 A1  10/2011  Weaver et al.
(Continued)

FOREIGN PATENT DOCUMENTS

CN    102004573 A    4/2011
CN    103221911 A    7/2013
(Continued)

OTHER PUBLICATIONS

Chinese language office action dated Oct. 4, 2016, issued in application No. TW 104127452.
(Continued)

*Primary Examiner* — Sahlu Okebato
(74) *Attorney, Agent, or Firm* — McClure, Qualey & Rodack, LLP

(57) ABSTRACT

A display touch device includes a touch panel disposed on one side of a display panel and third patterned electrodes disposed on a supporting substrate. The touch panel includes a transparent substrate; first and second patterned electrodes respectively disposed on the transparent substrate in first and second direction. Mutual capacitors are formed between the first and second patterned electrodes, and the first and second patterned electrodes form a touch sensor structure. The first patterned electrodes or the second pattern electrodes partially overlap with the third patterned electrodes in a third direction to form a pressure sensor structure. The third direction is a stacking direction of the display panel and the touch panel. The touch sensor structure performs touch sensing in a first period of a frame and performs pressure sensing in a second period of the frame. The first period does not overlap the second period.

10 Claims, 22 Drawing Sheets

(56) References Cited

U.S. PATENT DOCUMENTS

| | | | |
|---|---|---|---|
| 2012/0038583 A1* | 2/2012 | Westhues | G06F 3/0412 345/174 |
| 2013/0229595 A1 | 9/2013 | Shinkai et al. | |
| 2014/0049508 A1* | 2/2014 | Kim | G06F 3/044 345/174 |
| 2015/0130742 A1 | 5/2015 | Chen et al. | |
| 2016/0092010 A1* | 3/2016 | Agarwal | G06F 3/0412 345/173 |
| 2016/0299614 A1 | 10/2016 | Yang et al. | |
| 2017/0010728 A1* | 1/2017 | Kurasawa | G06F 3/0414 |

FOREIGN PATENT DOCUMENTS

| | | |
|---|---|---|
| TW | M491202 U | 12/2014 |
| TW | 201528100 A | 7/2015 |

OTHER PUBLICATIONS

Chinese language office action dated Sep. 25, 2018, issued in application No. CN 201510522341.X.
Chinese language office action dated May 21, 2019, issued in application No. CN 201510522341.X.

* cited by examiner

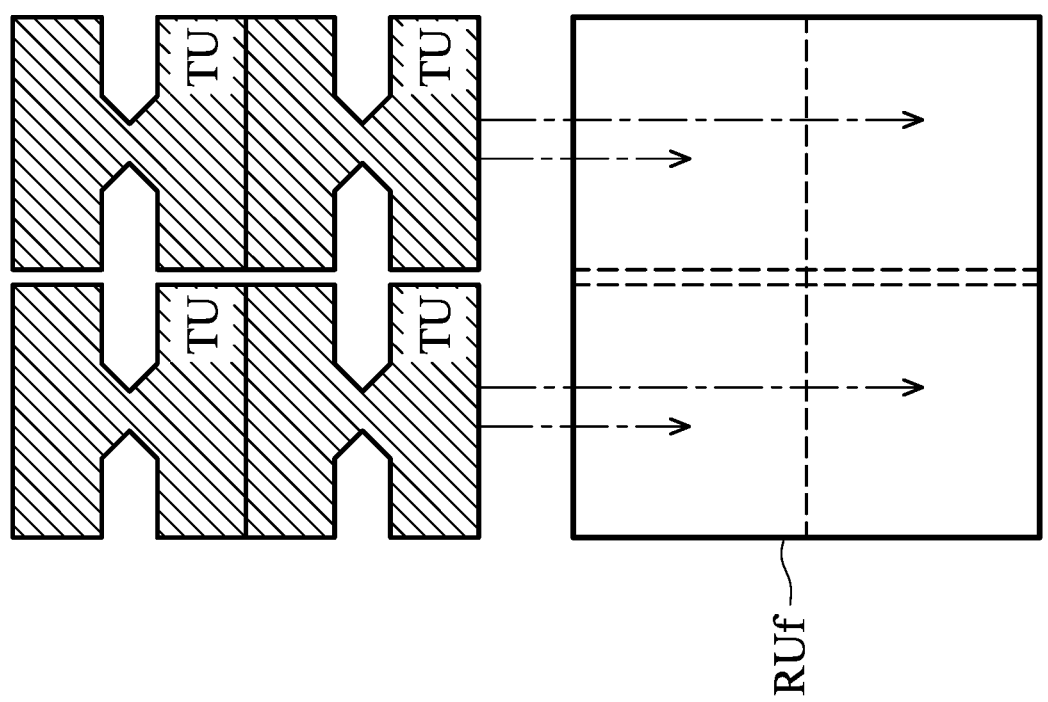

US 10,817,118 B2

DISPLAY TOUCH DEVICE

CROSS REFERENCE TO RELATED APPLICATIONS

This application is a Divisional of U.S. patent application Ser. No. 15/244,199, filed Aug. 23, 2016 and entitled "DISPLAY TOUCH DEVICE," which claims priority of Taiwan Patent Application No. 104127452, filed on Aug. 24, 2015, the entirety of which is incorporated by reference herein.

BACKGROUND

Field of the Invention

The present invention relates to a display touch device, and in particular to a display touch device having a touch sensor structure and a pressure sensor structure.

Description of the Related Art

In recent years, display touch devices having touch and display functions have attracted much more attention than before. This is especially true of mutual-capacitance type touch panels: this kind of touch panel obtains the coordinates of the position where the user touches using driving electrodes in the X direction and sensing the variance of capacitance in the Y direction. However, it is difficult to identify coordinates when a non-conductor is used for input. Thus, there is a need for a new display touch panel to solve the aforementioned problem.

BRIEF SUMMARY

An embodiment of a display touch device is provided, and the display touch device comprises a display panel, a touch panel, a plurality of first patterned electrodes, a plurality of second patterned electrodes, and a plurality of third patterned electrodes. The touch panel is disposed on one side of the display panel, and the touch panel comprises a transparent substrate. The first patterned electrodes are disposed on the transparent substrate in a first direction. The second patterned electrodes are disposed on the transparent substrate in a second direction. A plurality of mutual capacitors are formed between the first patterned electrodes and the second patterned electrodes. The first patterned electrodes and the second patterned electrodes form a touch sensor structure. The third patterned electrodes are disposed on a supporting substrate. The first patterned electrodes partially overlap with the third patterned electrodes in a third direction, or the second patterned electrodes partially overlap with the third patterned electrodes in the third direction to form a pressure sensor structure. The third direction is the stacking direction of the display panel and the touch panel. The touch sensor structure performs touch sensing in a first period of a frame and the pressure sensor structure performs pressure sensing in a second period of the frame, wherein the first period does not overlap the second period.

BRIEF DESCRIPTION OF THE DRAWINGS

FIG. 6C is another diagram of the projecting area of the electrode portion of the first patterned electrodes and the projecting area of the electrode portions of the third patterned electrodes.

DETAILED DESCRIPTION

Figure 1A:
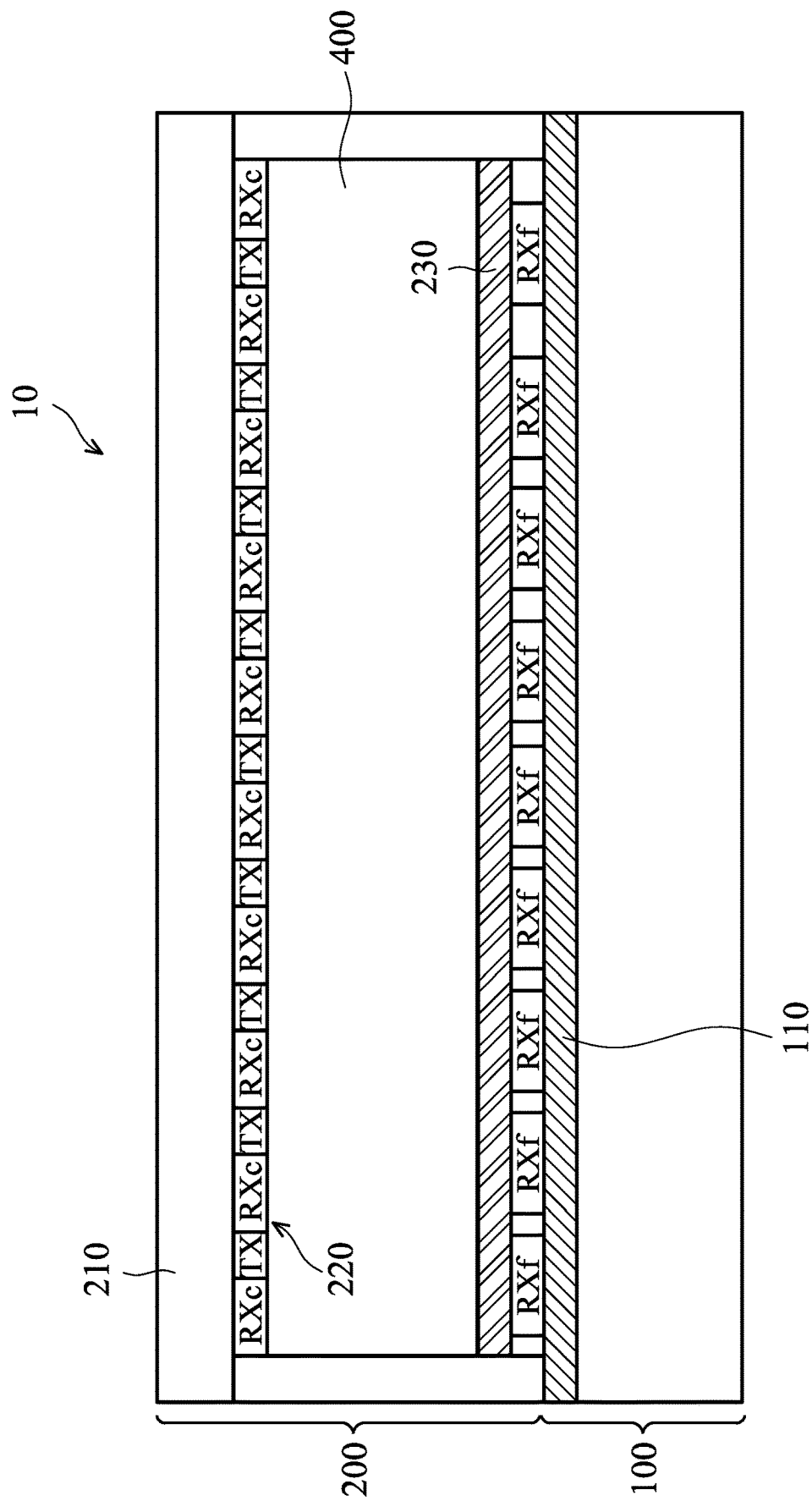
FIG. 1A is a diagram of a display touch device according to the invention.

FIG. 1A is a diagram of a display touch device according to an embodiment of the invention. As shown in figure, the display touch device 10 includes a display panel 100 and a touch panel 200. The touch panel 200 is disposed on one side of the display panel 100. For example, the display panel 100 may be a liquid-crystal display panel, a field emission display panel, an electroluminescent display panel, an organic light-emitting diode panel or a plasma display panel, but it is not limited thereto. In one embodiment, the touch panel 200 is disposed on one side of a color filter substrate which faces the user.

In one embodiment of the present invention, the touch panel 200 performs the two functions of touch sensing and pressure sensing. As shown in FIG. 1A, the touch panel 200 at least includes a plurality of first patterned electrodes TX, a plurality of second patterned electrodes RXc, and a plurality of third patterned electrodes RXf. The first patterned electrodes TX are disposed on the first side of the transparent substrate 210 and the first side is toward the display panel 100. The second patterned electrodes RXc is disposed on the first side of the transparent substrate 210. The first patterned electrodes TX and the second patterned electrodes RXc form a touch sensing structure. Herein, the touch sensor structure detects variance of boundary capacitance between the first patterned electrodes TX and the second patterned electrodes RXc to determine whether there is a touch or not. For example, the transparent substrate 210 can serve as a transparent cover plate for the touch panel 200. The transparent cover plate includes the glass cover plate, the plastic cover plate or the other cover plates which are made of high mechanical strength material to protect (such as scratch proof), cover or beautify the corresponding device. The thickness of the transparent cover plate can be between 0.2~2 mm. The transparent cover plate can be planar or curved, or a combination of the aforementioned shape, such as 2.5D glass, but it is not limited thereto. The transparent cover plate has transmittance of 85% or more. Moreover, one side of the transparent cover plate which is facing the user can be chosen to place an anti-smudge coating.

In one embodiment of the present invention, the first patterned electrodes TX as well as the second patterned electrodes RXc are formed in an insulating layer 220, and the first patterned electrodes TX as well as the second patterned electrodes RXc are separated by the insulating layer 220. Alternatively, the first patterned electrodes TX and the second patterned electrodes RXc are formed in the same layer when the insulating layer 220 is island-shaped.

Figure 1B:
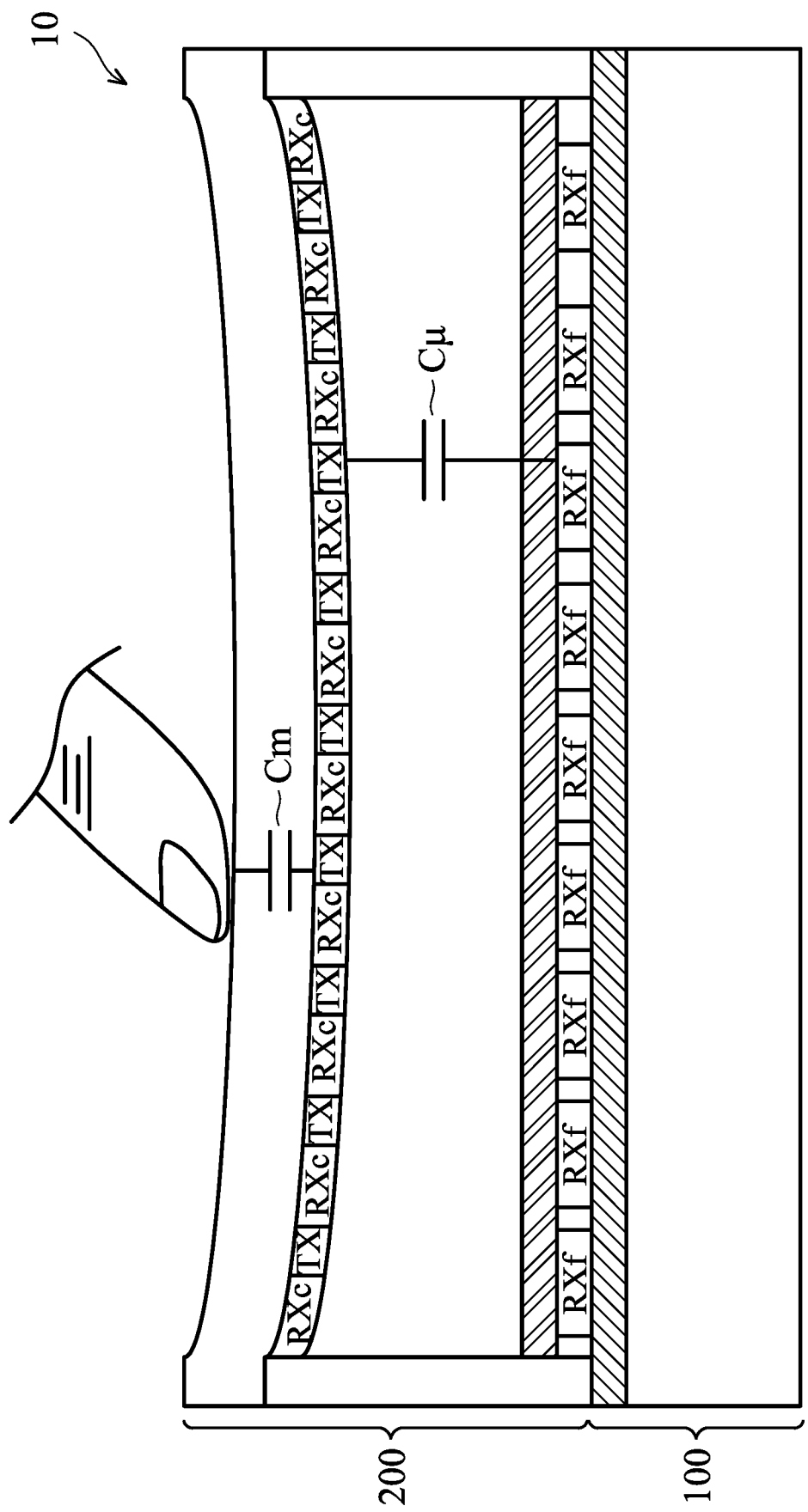
FIG. 1B is another diagram of a display touch device according to the invention.
Figure 1C:
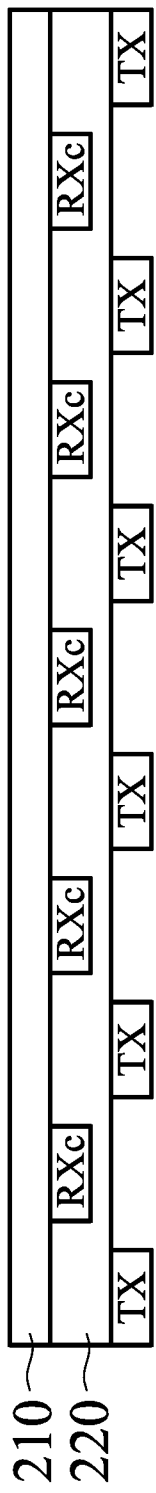
FIG. 1C is another diagram of a display touch device according to the invention.

In one embodiment as shown in FIG. 1C, the first patterned electrodes TX and the second patterned electrodes RXc are formed in different layers when the insulating layer 220 is the entire plane. The insulating layer 220 can be an organic insulating layer, inorganic insulating layer, or the stacking layer of organic insulating layer and inorganic insulating layer, wherein the material of the inorganic insulating layer can be silicon oxide or silicon nitride and the material of the organic insulating layer can be photosensitive resin or polyimide.

Figure 1D:
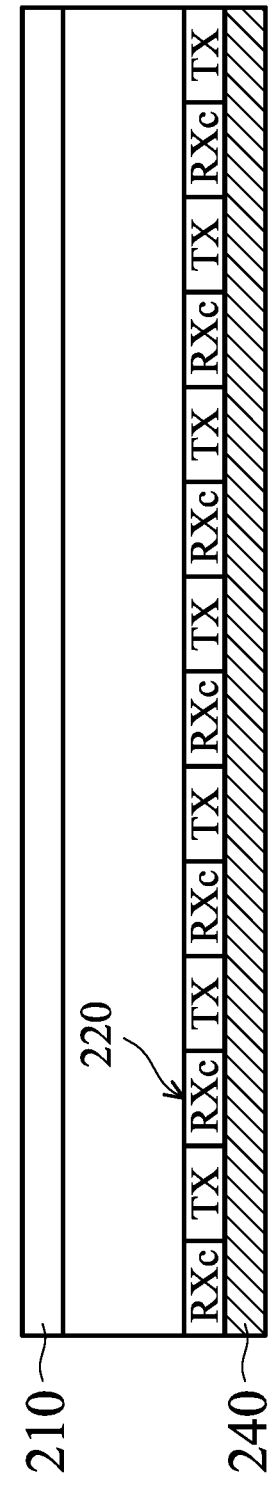
FIG. 1D is another diagram of a display touch device according to the invention.
Figure 1E:
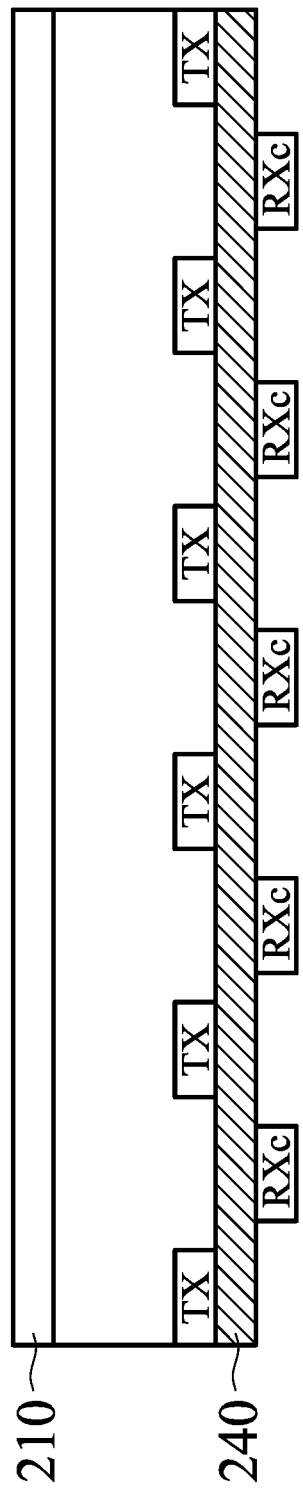
FIG. 1E is another diagram of a display touch device according to the invention.
Figure 1F:
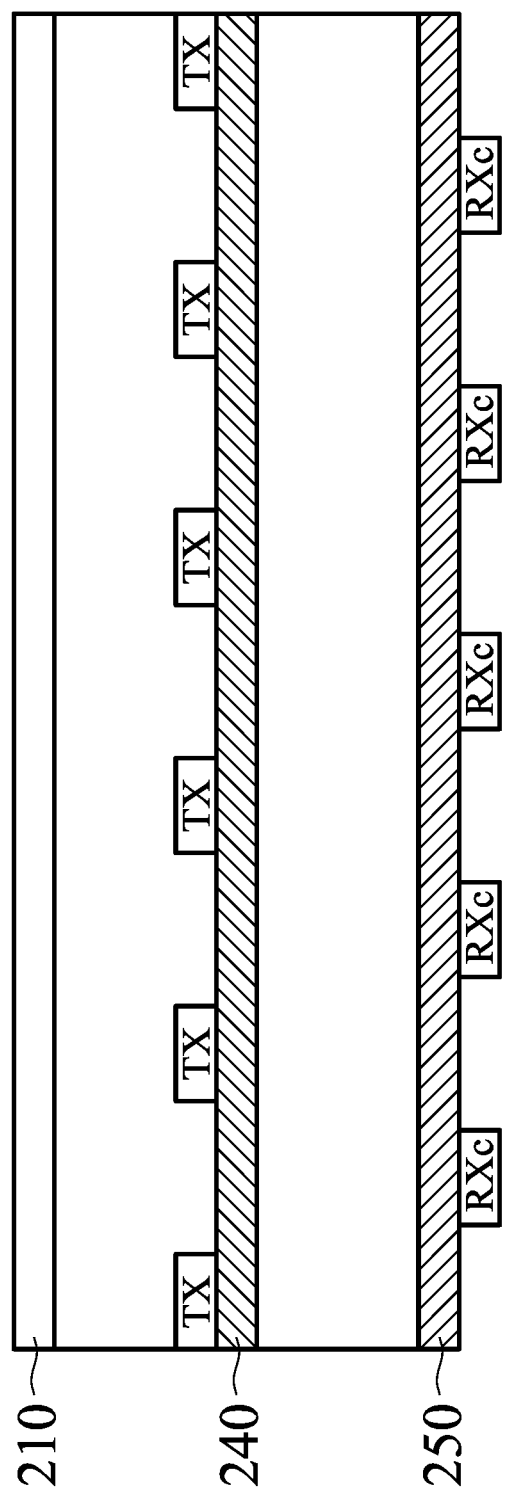
FIG. 1F is another diagram of a display touch device according to the invention.
Figure 1G:
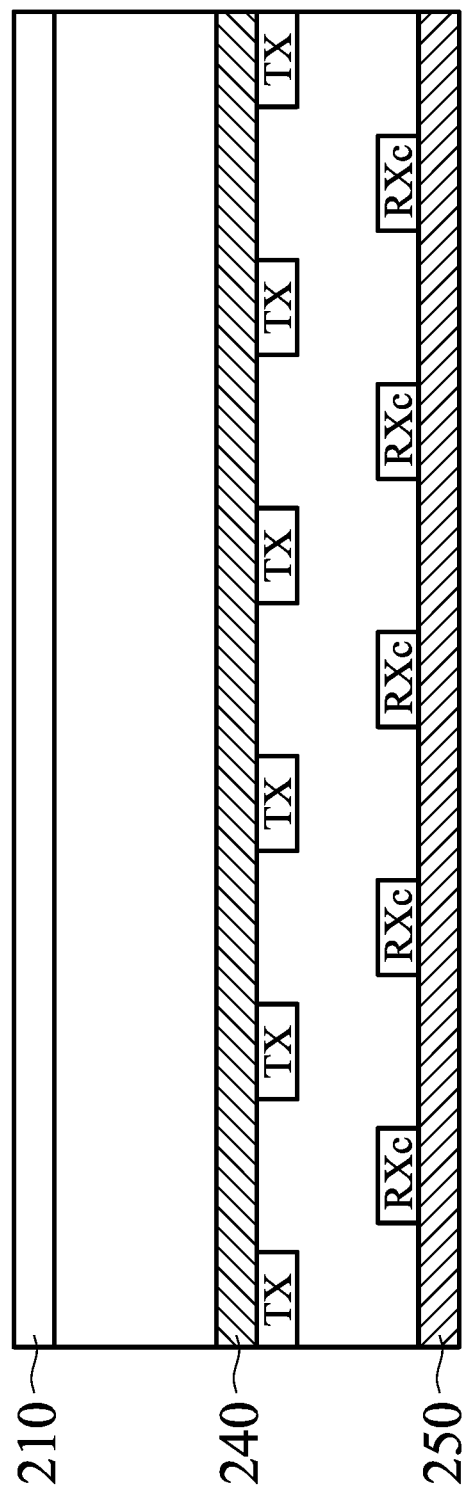
FIG. 1G is another diagram of a display touch device according to the invention.
Figure 1H:
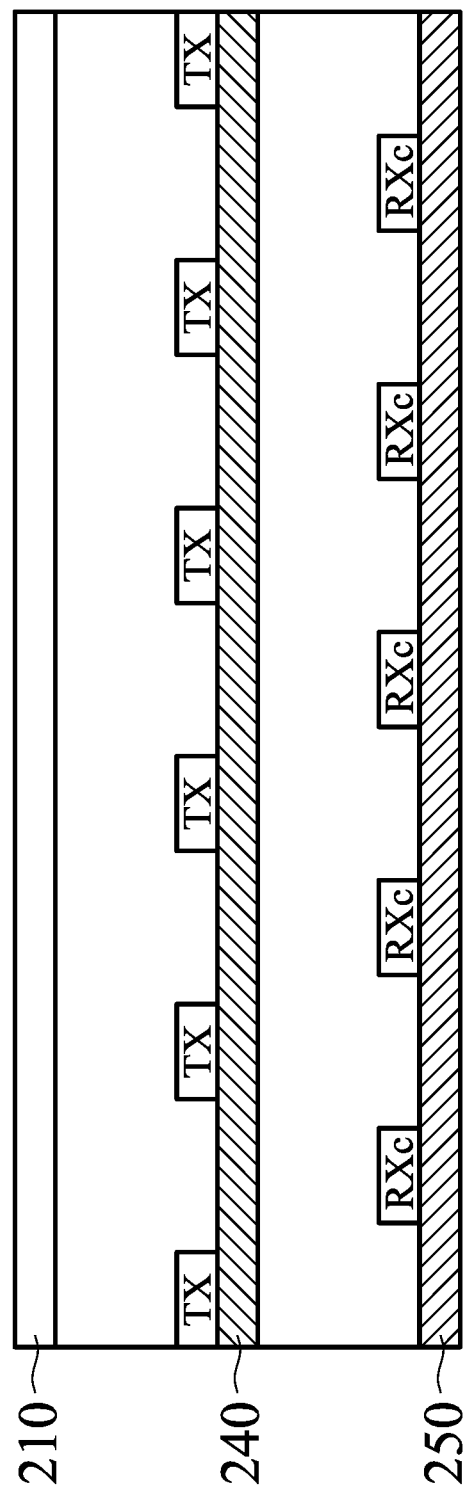
FIG. 1H is another diagram of a display touch device according to the invention.
Figure 1I:
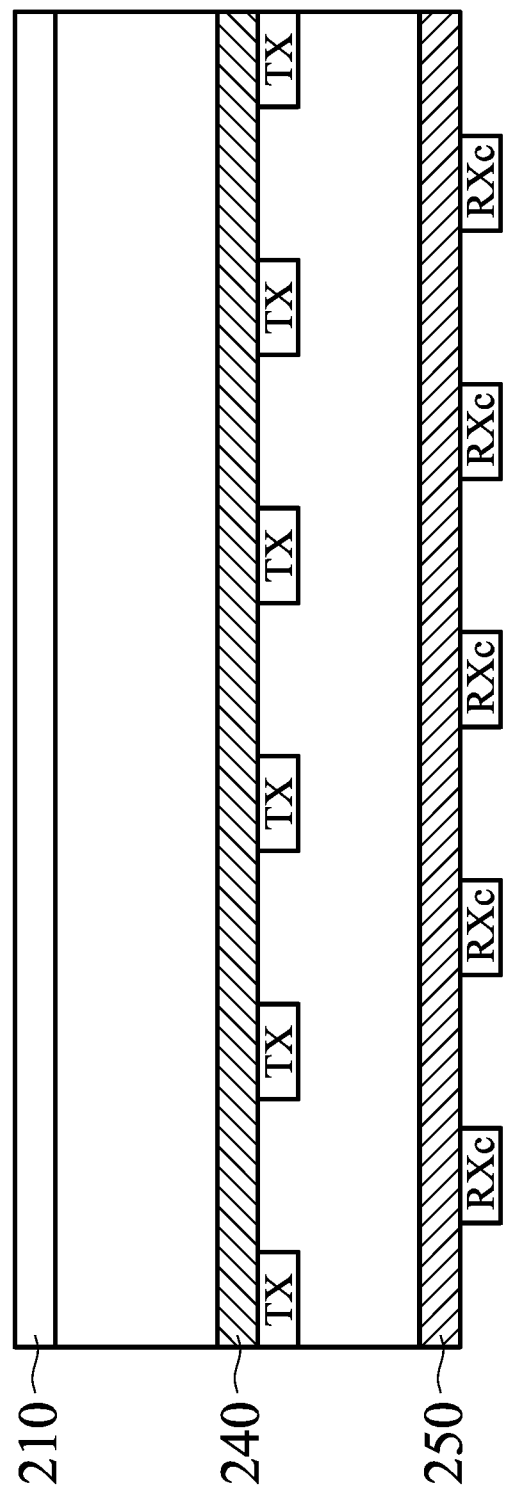
FIG. 1I is another diagram of a display touch device according to the invention.

In one embodiment shown in FIG. 1D, the first patterned electrodes TX and the second patterned electrodes RXc can be disposed on one side of another insulating substrate 240 and the insulating substrate 240 as well as the transparent substrate 210 are laminated together. For example, the insulating substrate 240 is a transparent insulating film, a transparent insulating plastic substrate, a transparent insulating glass substrate, or the flexible organic substrate such as polyimide, but it is not limited thereto. In one embodiment as shown in FIG. 1E, the first patterned electrodes TX and the second patterned electrodes RXc can be disposed on opposite sides of the insulating substrate 240, and the insulating substrate 240 as well as the transparent substrate 210 are laminated together. For example, the insulating substrate 240 is a transparent insulating film, a transparent insulating plastic substrate, a transparent insulating glass substrate, or a flexible organic substrate such as polyimide, but it is not limited thereto.

In the embodiments as shown in FIGS. 1F, 1G, 1H, and 1I, the first patterned electrodes TX and the second patterned electrodes RXc can be respectively disposed on one side of the insulating substrate 240 and one side of another insulating substrate 250. Two insulating substrates 240 and 250 are laminated with the transparent substrate 210. For example, the insulating substrate 240 and 250 are transparent insulating films, transparent insulating plastic substrates, transparent insulating glass substrates, or flexible organic substrates such as polyimide, but they are not limited thereto.

A plurality of capacitors are formed between the first patterned electrodes TX and the second patterned electrodes RXc. For example, in FIG. 3, the insulating gap exists between the electrode portions TU of the first patterned electrodes TX and the electrode portions RU of the second patterned electrodes RXc, and the mutual capacitors are formed in the gap. In some embodiments, the first patterned electrodes TX can serve as driving electrodes and the second patterned electrodes RXc can serve as touch sensor electrodes, but they are not limited thereto. In one embodiment of the present invention, the interference from the display panel 100 can be reduced when the first patterned electrodes TX and the second patterned electrodes RXc are formed in the same layer and the first patterned electrodes TX and the second patterned electrodes RXc are disposed on the side of the touch panel 200 which is farther from the display panel 100.

The third patterned electrodes RXf are disposed on a supporting substrate 110 such as the color filter substrate in the display panel 100, and the third patterned electrodes RXf is toward the touch panel 200. The first patterned electrodes TX and the third patterned electrodes RXF form a pressure sensor structure. The pressure sensor structure detects variance of capacitance which are formed between the first patterned electrodes TX and the third patterned electrodes RXf in the stacking direction of the display panel 100 and the touch panel 200 to determine whether there is a touch or not. FIG. 1A is one embodiment of the structure of the third patterned electrodes RXf. The third patterned electrodes RXf are formed between the surface of the color filter substrate 110 in the display panel 100 which is toward the touch panel 200 and the surface of the polarizing plate 230 in the touch panel 200 which is toward the display panel 100. In one embodiment, the third patterned electrodes RXf can be formed in an insulating layer (not shown in figure) between the color filter substrate 110 and the polarizing plate 230 and separates the color filter substrate 110 and the polarizing plate 230 from each other. For example, the third patterned electrodes RXf can also serve as the pressure sensor electrodes. The first patterned electrodes TX and the third patterned electrodes RXf form a plurality of mutual capacitors to form the pressure sensor structure. In some embodiments, the touch sensor structure in the touch panel 200 are laminated to the display panel 100 by a medium layer 400, such as the air, the optical clear resin (OCR), or the optical clear adhesive (OCA). For example, referring to FIG. 1, the third patterned electrodes RXf are disposed between the display panel 100 and the touch panel 200, and the medium layer 400 is between the third patterned electrodes RXf and the first patterned electrodes TX. In one embodiment of the present invention, the aforementioned optical clear resin or the optical clear adhesive can be deformed. In some embodiments, the medium layer (such as the air, the oil, the glue, the insulating medium layer (i.e., dielectric layer) and so on) is formed between the touch panel 200 and the display panel 100 which has the third patterned electrodes RXf. In one embodiment of the present invention, the thickness of the medium layer is, but is not limited to, less than or equal to 0.5 mm. In another alternative embodiment, the third patterned electrodes RXf are disposed on another supporting substrate, and the supporting substrate having the third patterned electrodes RXf is laminated between the display panel 100 and the touch panel 200.

In one embodiment of the present invention, the mutual capacitors are formed between the first patterned electrodes TX and the third patterned electrodes RXf, which are stacked on each other in the vertical direction (such as the stacking direction of the display panel 100 and the touch panel 200, the direction toward the user, or the direction toward the color filter substrate 110). In one embodiment of the present invention, the mutual capacitors are formed between the first patterned electrodes TX and the second patterned electrodes RXc, which are stacked on each other in the horizontal direction.

FIG. 1B is another diagram of the display touch device according to an embodiment of the invention. As shown in figure, in the first mode, a boundary electric field is formed between the first patterned electrodes TX and the second patterned electrodes RXc when the first patterned electrodes TX send a driving signal. When the finger touches, the induction capacitor(s) Cm changes the equivalent boundary capacitors (induced by boundary electric field) between the first patterned electrodes TX and the second patterned electrodes RXc because the finger is the conductor which can attract the electric line (as equivalently shown in FIG. 1B) of the boundary electric field of the first patterned electrodes TX, as well as the second patterned electrodes RXc and the second patterned electrodes RXc collect capacitance variation. Furthermore, in the second mode, the first patterned electrodes TX which send the driving signal and the third patterned electrodes RXf which sense the pressure form the induction capacitor(s) Cu. When the touch panel 200 is deformed under the pressure, the distance between the first patterned electrodes TX and the third patterned electrodes RXf is shortened. Therefore, the capacitance variation of the induction capacitor(s) Cμ will be changed, and the third patterned electrodes RXf are configured to collect the variance of the induction capacitor(s) Cu. In the embodiment, under the pressure, the deformation of the touch panel 200 is generated by the conductor (such as the finger) and/or non-conductor (such as a stylus or a hand with a glove). In one embodiment of the present invention, the first patterned electrodes TX, the second patterned electrodes RXc, and the third patterned electrodes RXf are all patterned electrodes, therefore the touch sensor structure and the pressure sensor structure can simultaneously be a multi-touch/multi-detection structure.

Figure 2:
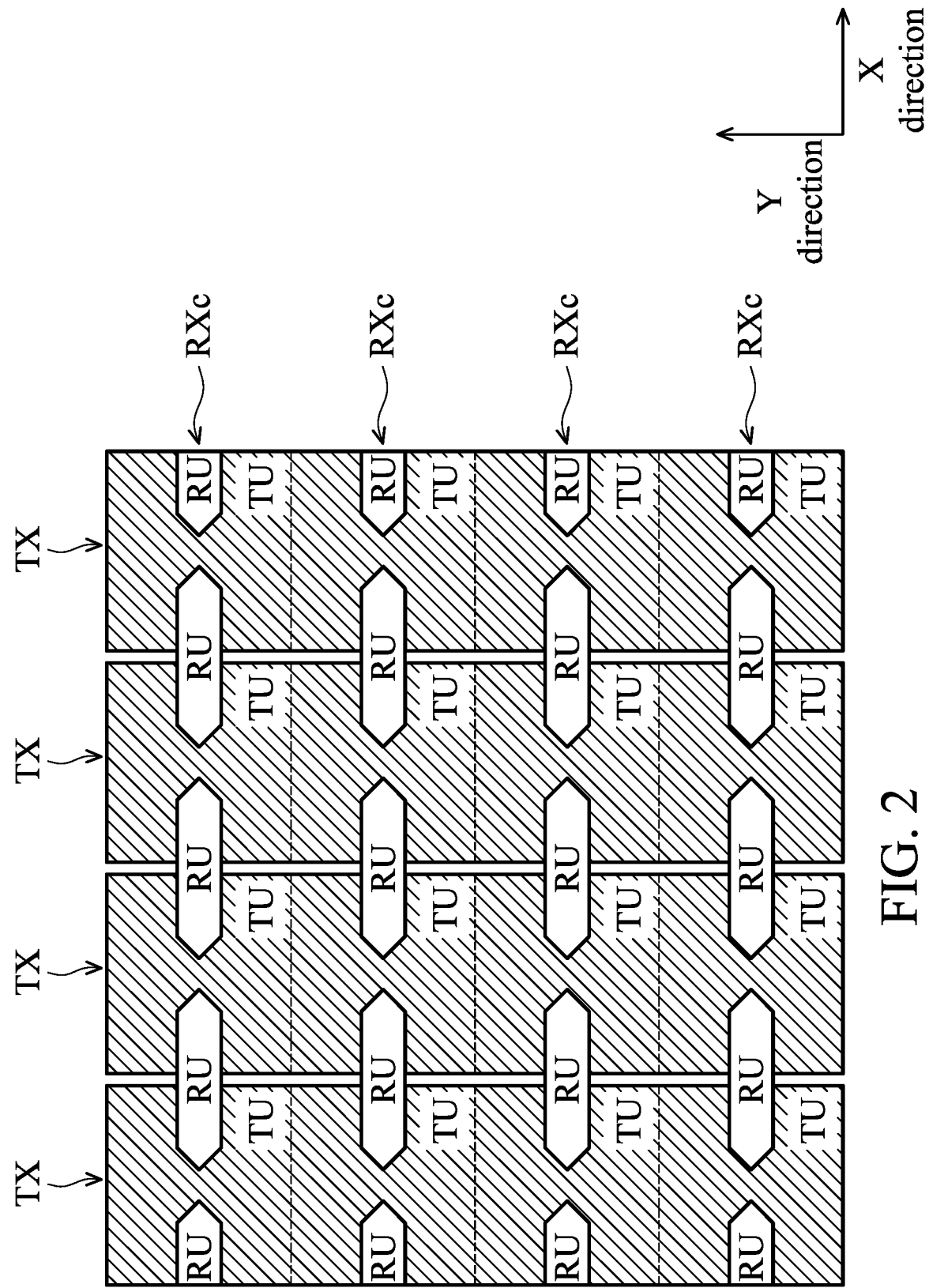
FIG. 2 is a diagram of the first patterned electrodes TX and the second patterned electrodes RXc.
Figure 3:
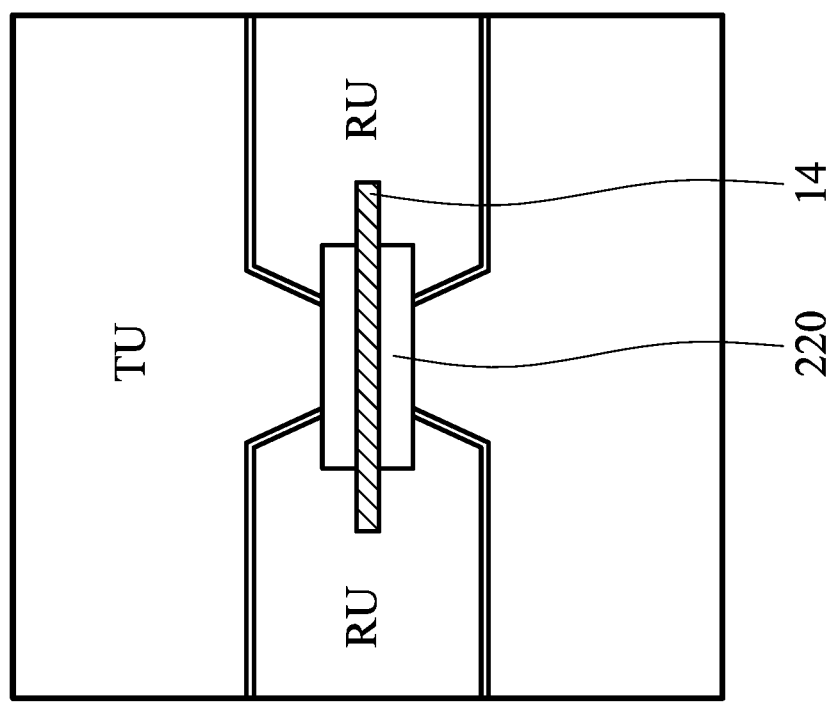
FIG. 3 is a diagram of the electrode portions TU and the electrode portions RU.

FIG. 2 is a partial diagram of the first patterned electrodes TX and the second patterned electrodes RXc. As shown in figure, the first patterned electrodes TX are arranged in the first direction (such as X direction) on the transparent substrate 210, and the first patterned electrodes TX are formed extending in the second direction (such as the Y direction). Each of the first patterned electrodes TX includes a plurality of electrode portions TU which are arranged in the second direction and electrically connected to each other. In some embodiments, a plurality of electrode portions TU of the first patterned electrodes TX are formed in the same process and these electrode portions TU are continuous and non-disconnected. Each of the second patterned electrodes RXc include a plurality of electrode portions RU which are arranged in the first direction and electrically connected to each other. It is noted that a plurality of electrode portions RU in the second patterned electrodes RXc are electrically connected into a string by the conductive material. For example, as shown in FIG. 3, two adjacent electrode portions RU shown in FIG. 2 are electrically connected by a wire 14, and the wire 14 is separated from the electrode portions TU of the first patterned electrodes TX by an island-shaped insulating layer 220. In this embodiment, the second direction is vertical to the first direction. In another embodiment, the second direction can only interlace with the first direction.

Figure 4:
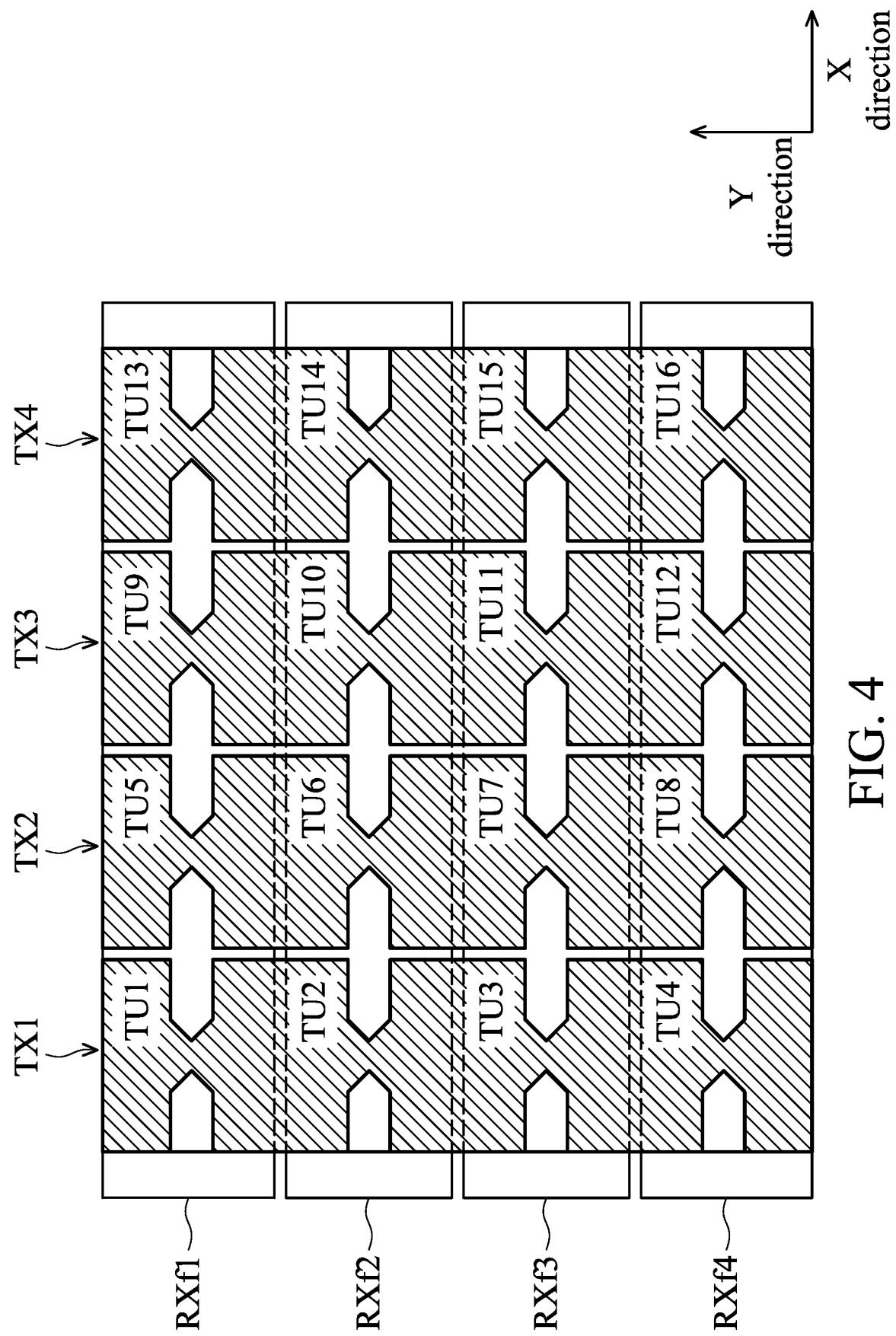
FIG. 4 is a diagram of the first patterned electrodes TX and the third patterned electrodes RXf.

FIG. 4 is a diagram of the first patterned electrodes TX and the third patterned electrodes RXf. As shown, the third patterned electrodes RXf1, RXf2, RXf3, and RXf4 can be in the stripe shape extending along the first direction (X direction) and can be separated from each other by the insulating material. Each of electrode portions TU has the first projecting area (not shown in figure) in the vertical direction (such as the stacking direction of the display panel 100 and the touch panel 200, the direction toward the user or the direction toward the color filter substrate 110) on the display panel 100. Each of the third patterned electrodes RXf1, RXf2, RXf3, and RXf4 has the second projecting area in the stacking direction of the display panel 100 and the touch panel 200 on the touch panel 200. The first projecting area is completely within the corresponding second projecting area of the third patterned electrodes RXf1, RXf2, RXf3, and RXf4. In this embodiment, the first projecting area of the electrode portions TU1, TU5, TU9, and TU13 on the display panel 100 are all within the second projecting area of the third patterned electrodes RXf1. The first projecting area of the electrode portions TU2, TU6, TU10, and TU14 on the display panel 100 are all within the second projecting area of the third patterned electrodes RXf2, and so on. In another embodiment, the portions of the first patterned electrodes TX which are not overlapping with the second projecting area of the third patterned electrodes RXf1~RXf4 can be regarded as the connecting portion of the first patterned electrodes TX, and are configured to connect two adjacent electrode portions, such as TU1 and TU2. In this embodiment, the first patterned electrodes TX1~TX4 are sequentially driven by one line at a time so that the second patterned electrodes RXf1~RXf4 perform sensing.

Figure 5:
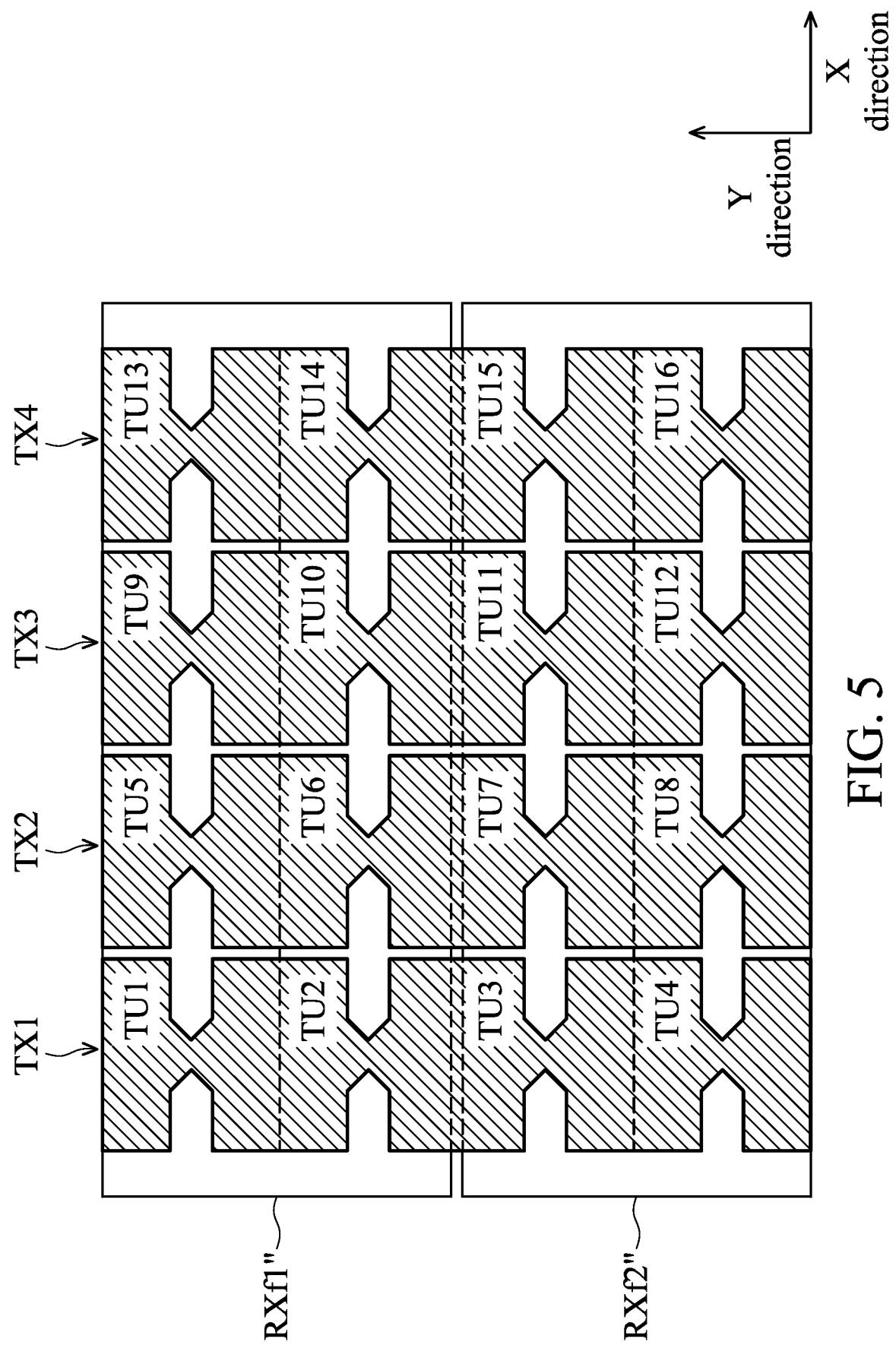
FIG. 5 is another diagram of the first patterned electrodes TX and the third patterned electrodes RXf.

FIG. 5 is another diagram of the first patterned electrodes TX and the third patterned electrodes RXf. As shown, the third patterned electrodes RXf1" and RXf2" can be in the stripe shape extending along the first direction (X direction) and can be separated from each other by the insulating material. Each of electrode portions TU has the first projecting area (not shown in figure) on the display panel 100 in the stacking direction of the display panel 100 and the touch panel 200. Each of the third patterned electrodes RXf1" and RXf2" have the second projecting area on the touch panel 200 in the stacking direction of the display panel 100 and the touch panel 200. The first projecting areas of two adjacent and electrically connected electrode portions are completely within the corresponding second projecting area of the third patterned electrodes. For example, the first projecting areas of adjacent electrode portions TU1 and TU2 of the first patterned electrodes TX1 are completely within the corresponding second projecting area of the third patterned electrodes RXf1", and so on. Specifically, the first projecting areas of the electrode portions TU1, TU2, TU5, TU6, TU9, TU10, TU13, and TU14 on the display panel 100 are all within the second projecting area of the third patterned electrodes RXf1". The first projecting areas of the electrode portions TU3, TU4, TU7, TU8, TU11, TU12, TU15, and TU16 on the display panel 100 are all within the second projecting area of the third patterned electrodes RXf2". In this embodiment, the first patterned electrodes TX1~TX4 are sequentially driven by one line at a time so that the third electrodes RXf1" and RXf2" perform sensing. Under the state of being pressed, the capacitance variation sensed by the third patterned electrodes RXf1" or RXf2" can be two times as much as any of the third patterned electrodes RXf1~RXf4 in FIG. 4. In another embodiment, the first patterned electrodes TX1~TX4 can also be sequentially driven by two lines at a time so that so that the third electrodes RXf1" and RXf2" perform sensing. Under the state of being pressed, the capacitance variation sensed by the third patterned electrodes RXf1" or RXf2" can be four times as much as any of the third patterned electrodes RXf1~RXf4 in FIG. 4.

Figure 6A:
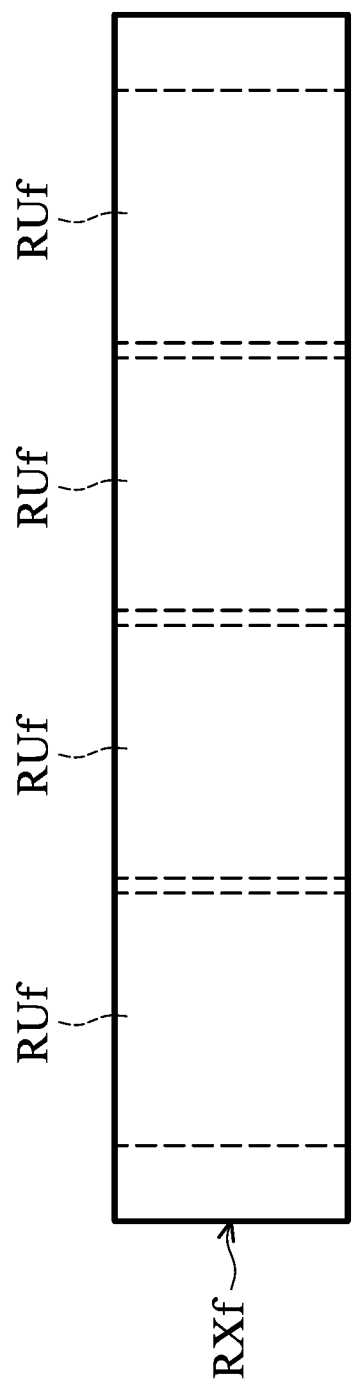
FIG. 6A is a diagram of the third patterned electrodes.
Figure 6B:
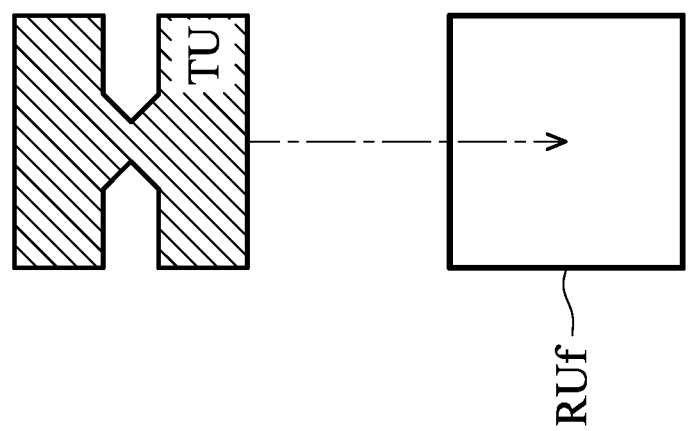
FIG. 6B is a diagram of the projecting area of the electrode portions of the first patterned electrodes and the projecting area of the electrode portions of the third patterned electrodes.
Figure 6D:
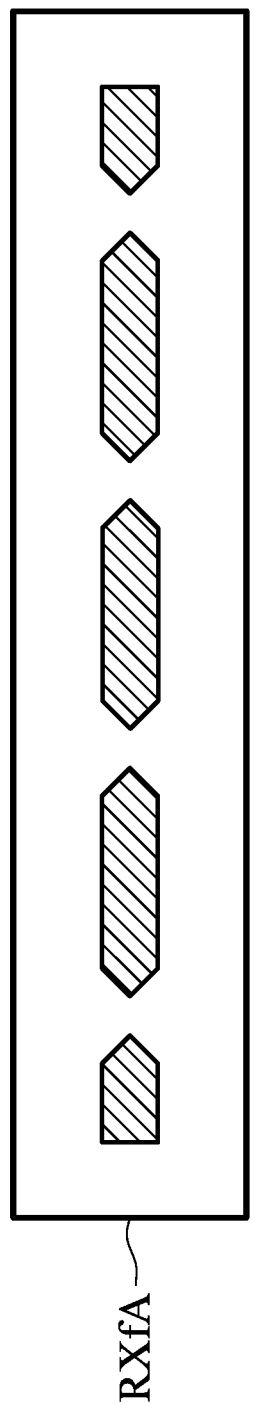
FIG. 6D is another diagram of the third patterned electrodes.

FIG. 6A is a diagram of the third patterned electrodes RXf. As shown, the third patterned electrodes RXf include a plurality of electrode portions RUf which are non-overlapping and arranged in the first direction. Each of the electrode portions RUf in the vertical direction on the touch panel 200 has the third projecting area. FIG. 6B is a diagram of the projecting area of the electrode portions of the first patterned electrodes and the projecting area of the electrode portions of the third patterned electrodes. As shown in figure, the first projecting area of the electrode portions TU in the vertical direction on the display panel 100 is completely within the third projecting area of the electrode portions RUf. FIG. 6C is another diagram of the projecting area of the electrode portions of the first patterned electrodes and the projecting area of the electrode portions of the third patterned electrodes. As shown in figure, the first projecting areas of the four electrode portions TU (such as the two adjacent pairs of the electrode portions TU of the first patterned electrodes TX1 and TX2) on the display panel 100 are completely within the third projecting area of the electrode portions RUf. As shown in FIGS. 6B and 6C, the projecting area of the electrode portions RUf is greater than the projecting area of any electrode portion TU of the first patterned electrodes TX. FIG. 6D is another diagram of the third patterned electrodes. As shown in the figure, the overlapping portions of the third patterned electrodes RXfA and the second patterned electrodes can be removed. As this time, the projecting area of each electrode portion RUf is equal to the projecting area of any electrode portion TU of the first patterned electrodes TX. In other words, in the embodiments of the present invention, the projecting area of each electrode portion RUf on the touch panel 200 is greater than or equal to the projecting area of any electrode portion TU of the first patterned electrodes TX on the display panel 100. The relationship between the projecting area of the electrode portions RUf and TU is not limited to the aforementioned embodiment. In another embodiment, the projecting area of each electrode portion RUf can be less than the projecting area of the electrode portions TU (not shown). According to some embodiments, the electrode portions TU are closer to the user than the electrode portions RUf, so that the electrode portions RUf, due to the shielding of the electrode portions TU, can't form the capacitance between the conductor and the electrode portions RUf to affect the operation of detecting signal when the user presses by the conductor.

Figure 7:
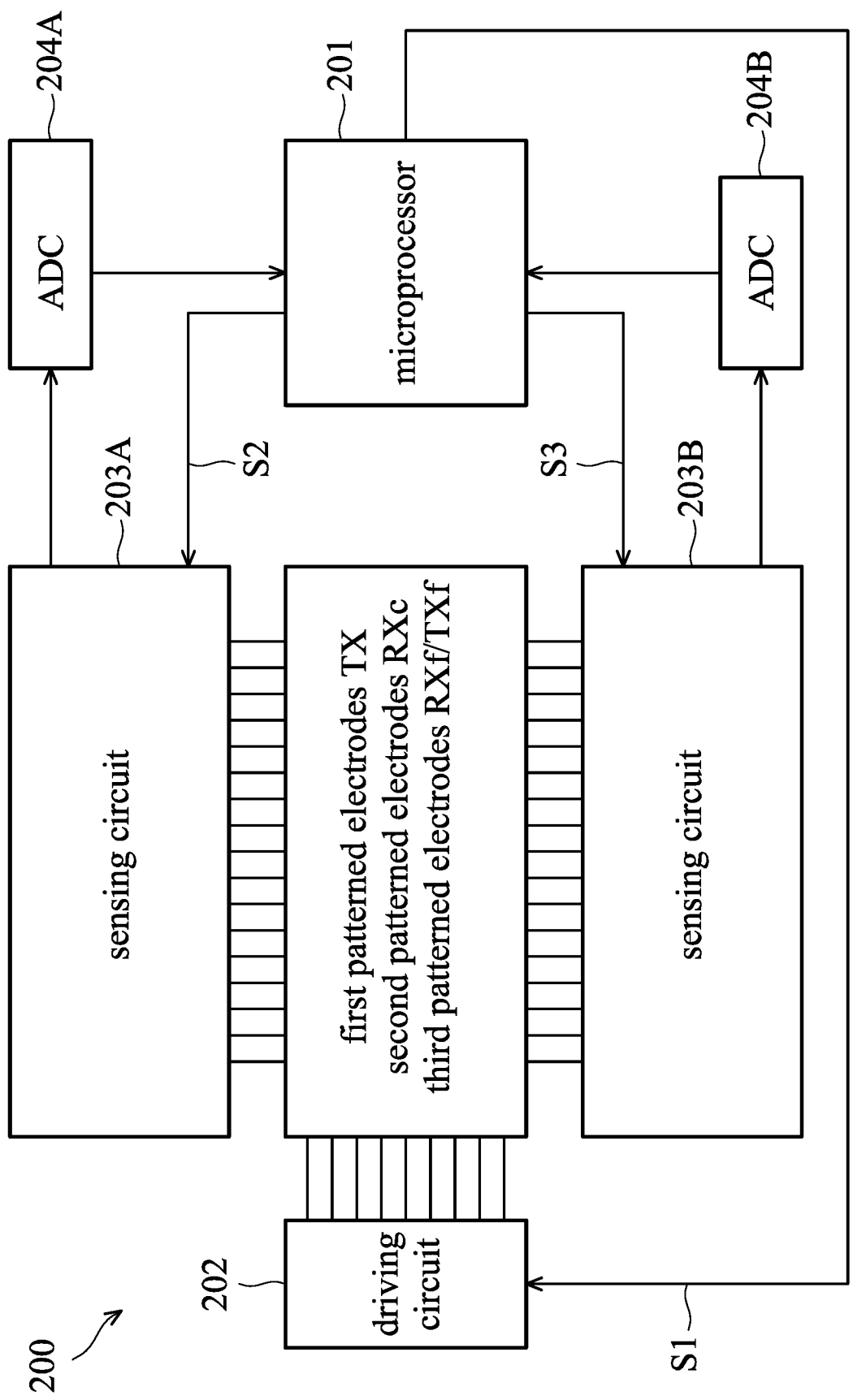
FIG. 7 is a circuit diagram of the touch panel.

FIG. 7 is a circuit diagram of the touch panel. As shown in figure, the touch panel 200 includes a microprocessor 201, a driving circuit 202, sensing circuits 203A and 203B, analog-to-digital converters 204A and 204B. For example, the driving circuit 202 is configured to send a control signal S1 according to the microprocessor 201 to selectively drive the first patterned electrodes TX. Under the first mode, the sensing circuit 203A is configured to sense the variance of the voltage or the charge of the second patterned electrodes RXc according to a control signal S2 which is output by the microprocessor 201, and generate the touch position data by analog-to-digital converter 204A and send the touch position data to the microprocessor 201 for the following processing. Under the second mode, the sensing circuit 203B is configured to sense the variance of the voltage or the charge of the third patterned electrodes RXf according to a control signal S3 which is output by the microprocessor 201, and generate the pressure sensing data by analog-to-digital converter 204B and send the pressure sensing data to the microprocessor 201 for the following processing. For example, the second patterned electrodes RXc are configured to sense tiny capacitance variations when a stylus or finger touches the touch panel 200, and to transform a capacitance variation into a voltage type which can be detected by the sensing circuit 203A. The third patterned electrodes RXf are configured to sense every tiny capacitance variation which is generated by the deformation of the touch panel 200 being pressed by the stylus or the finger, and to transform the capacitance variation into a type of voltage which can be detected by the sensing circuit 203B. In one embodiment, corresponding to the structure in FIG. 4, in the second mode, the sensing circuit 202 is configured to sequentially drive the first patterned electrodes TX by one line at a time according to the control signal S1 which is output by the microprocessor 201 so that the third patterned electrodes RXf sense the capacitance variation which is generated by the deformation of the touch panel 200. In another embodiment, corresponding to the structure in FIG. 5, under the second mode, the driving circuit 202 is configured to sequentially drive the first patterned electrodes TX by two lines at a time according to the control signal S1 which is output by the microprocessor 201 so that the third patterned electrodes RXf sense the capacitance variation which is generated by the deformation of the touch panel 200. In some embodiments, the sensing circuit 203A and 203B can also be integrated into one sensing circuit and selectively sense the variance of the voltage or charge of the second patterned electrodes RXc or the third patterned electrodes RXf by a multiplexer.

In one embodiment of the present invention, the microprocessor 201 is electrically coupled to the display panel 100. For example, the display panel 100 includes a gate driving circuit, a data signal sending circuit, a pixel matrix, and a control chip. Generally, the pixel matrix can include a plurality of gate signal lines, a plurality data signal lines, and a plurality of pixels. The gate driving circuit is configured to generate a plurality of gate driving signals to drive the pixels of the pixel matrix, and the data signal sending circuit is configured to generate a plurality of data signals to supply data to the pixels of the pixel matrix. The control chip is configured to generate a plurality of control signals which include the horizontal synchronous signal HS, the vertical synchronous signals VS, the clock signal, the starting pulse, and so on, to control the gate driving circuit, the data signal sending circuit, and the operation of the pixel matrix, so that the display panel 100 can display the image. For example, the display panel 100 drives the pixels of the pixel matrix to perform displaying in the display period of each frame. In one embodiment of the present invention, the microprocessor 201 can also be according to the horizontal synchronous signal HS and the vertical synchronous signals VS of the control chip of the display panel 100. In another embodiment, the microprocessor 201 and the control chip can be integrated into one.

Figure 8:
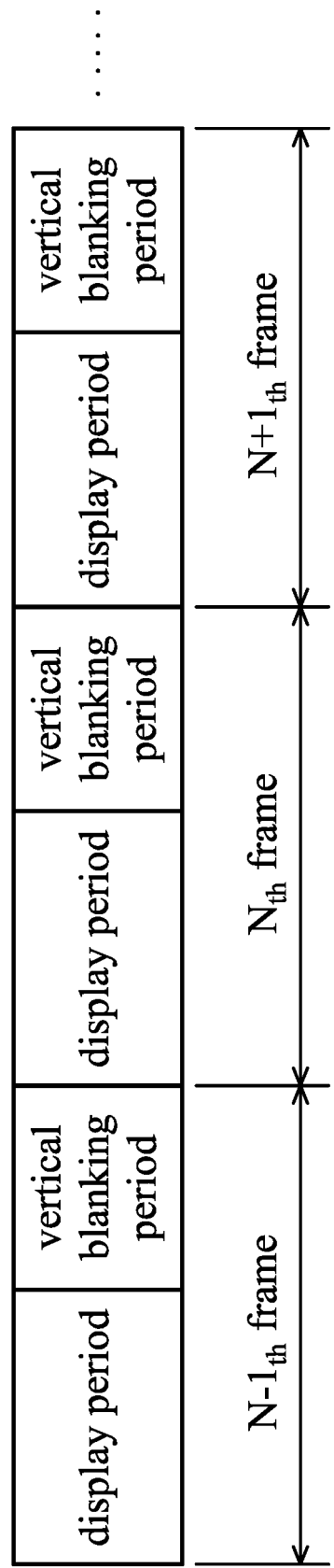
FIG. 8 is a diagram of the frame of the display touch device.

FIG. 8 is a diagram of frames of the display touch device. As shown in figure, each frame has a display period and a vertical blanking period and the display period is not overlapping with the vertical blanking period. In one embodiment, the touch panel 200 in the display period enters the first mode to perform touch sensing, and the touch panel 200 in the blanking period enters the second mode to perform pressure sensing. For example, in the display period, the third patterned electrodes RXf are coupled to a ground level, the driving circuit 202 selectively drives the first patterned electrodes TX (meaning that the first patterned electrodes send the driving signals) according to the control signal S1 which is output by the microprocessor 201, and the second patterned electrodes RXc are configured to collect the capacitance variation. In the display period, the third patterned electrodes RXf coupled to the ground level serve as the shielding layer of the second patterned electrodes RXc for the interference on the display panel 100. Furthermore, in the blanking period, the second patterned electrodes RXc are coupled to the ground level, the driving circuit 202 selectively drives the first patterned electrodes TX (meaning that the first patterned electrodes send the driving signals) according to the control signal S1 which is output by the microprocessor 201 and the third patterned electrodes RXf are configured to collect the capacitance variation which is induced by the deformation of the touch panel 200 under the pressure. In the blanking period, the first patterned electrodes TX and the second patterned electrodes RXc coupled to the ground level serve as the shielding layer of the third patterned electrodes RXf for the interference from the external object (such as the finger). In other words, the sensing of the touch sensor structure is synchronous with the display period of the display panel 100 and the third patterned electrodes RXf serve as the shielding layer of the touch sensor structure for the interference on the display panel 100. In another embodiment, the first mode and the second mode both can perform the operation of the touch sensing in the vertical blanking period.

Figure 9:
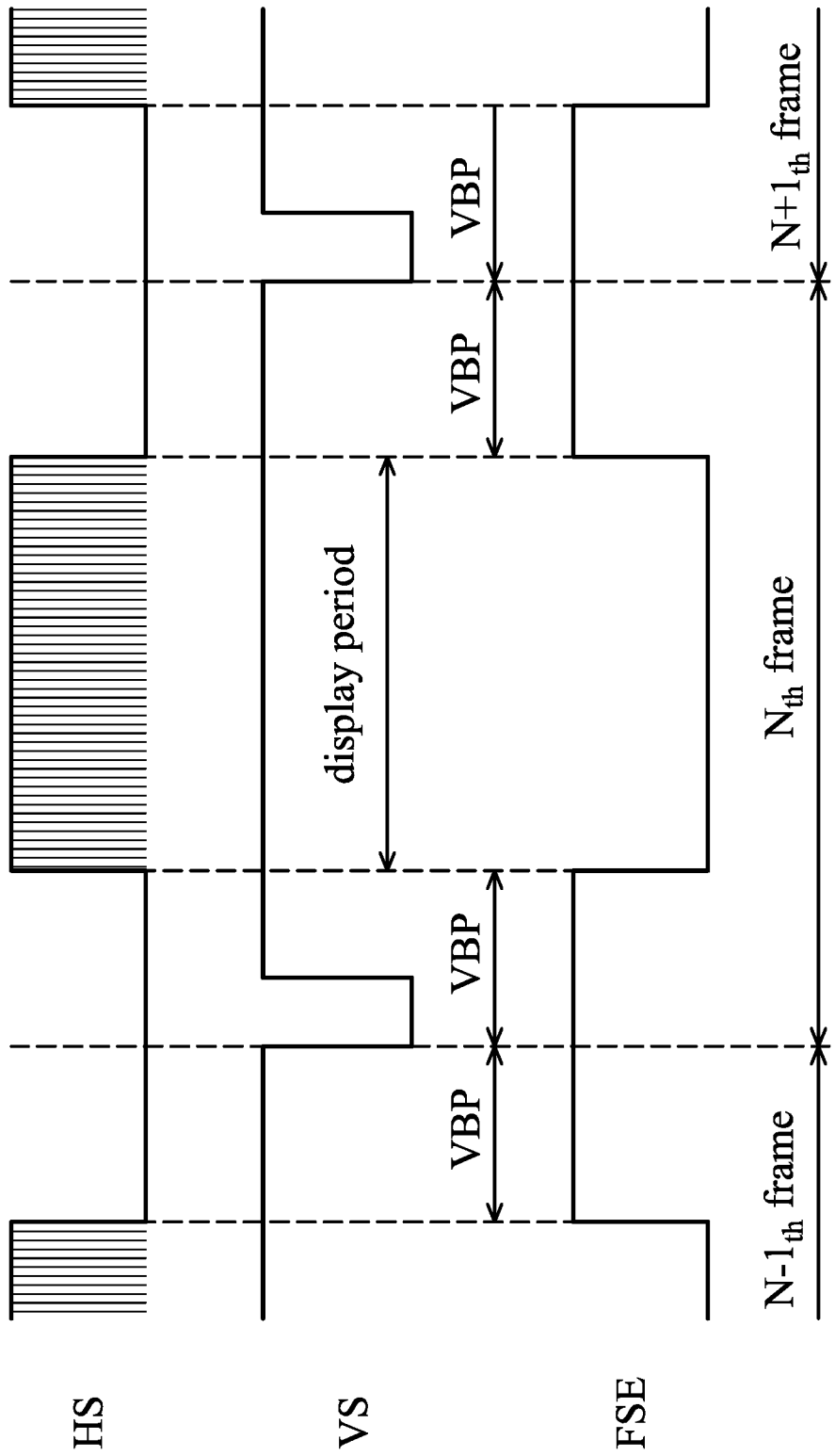
FIG. 9 is configured to explain the relationship among the pressure touch sensing signal, the horizontal synchronous signal HS, and the vertical synchronous signal VS in the display panel.

FIG. 9 is configured to explain the relationship among the pressure touch sensing signal, the horizontal synchronous signal HS, and the vertical synchronous signal VS in the display panel. As shown in figure, the complete vertical blanking period of the frame is divided by the display period into two portions VBP. However, because the latter VBP portion after the display period in the frame N and the former VBP before the display period in the frame N+1 form a complete vertical blanking period, the touch panel 200 enters the second mode to perform pressure sensing in the this complete vertical blanking period. In other words, the touch panel 200 enters the second mode to perform the pressure sensing when the pressure touch sensing signal FSE is at high level and enters the first mode to perform the touch sensing when the pressure touch sensing signal FSE is at low level. In this embodiment, the update rate or report rate of the pressure sensor structure is synchronous with the vertical synchronous signal VS to prevent the interference from the display panel 100. In one embodiment of the present invention, the microprocessor 201, according to the horizontal synchronous signal HS and/or the vertical synchronous signal VS, generates the touch sensing signal FSE to perform the touch sensing in the first mode and the pressure sensing in the second mode, but it is not limited thereto. In another embodiment of the present invention, the microprocessor 201 can be integrated into the control chip of the display panel 100, and the integrated control chip is configured to control the display panel 100 to perform displaying as well as the touch panel 200 to perform the touch sensing in the first mode and the pressure sensing in the second mode. In some embodiments, the first mode and the second mode of the touch panel 200 can be performed in the two non-overlapping period of the vertical blanking period. In other words, the pressure sensing and the touch sensing can be performed in the two non-overlapping periods of the vertical blanking period.

Figure 1J:
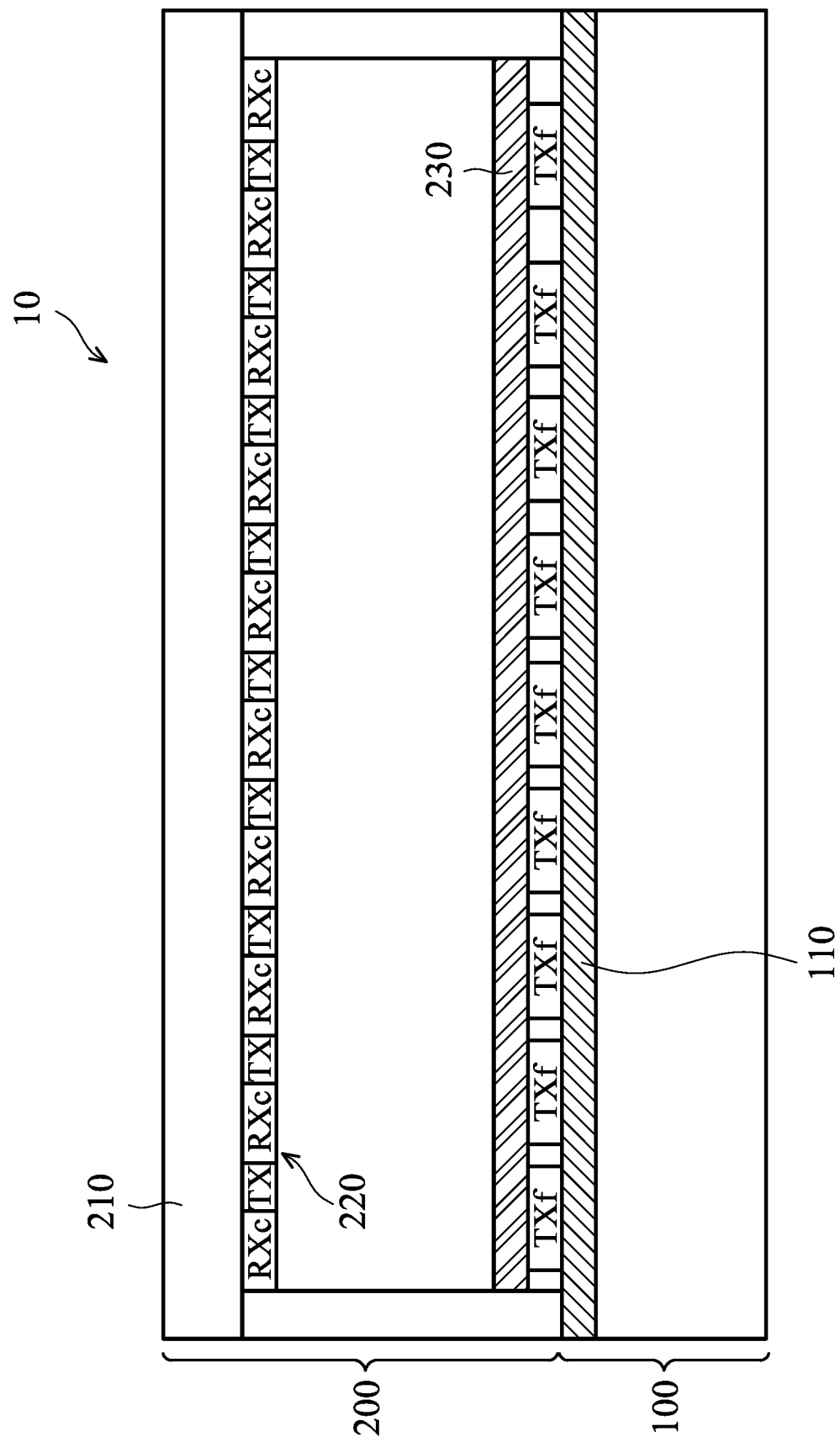
FIG. 1J is another diagram of a display touch device according to the invention.

In the embodiment as shown in FIG. 1J, the third patterned electrodes TXf are the driving electrodes, and the second patterned electrodes RXc as well as the third patterned electrodes TXf form the pressure sensor structure. That is, the second patterned electrodes RXc and the third patterned electrodes TXf can overlap, to form the mutual capacitors between the second patterned electrodes RXc and the third patterned electrodes TXf, so that the variance of the mutual capacitors for sensing can be measured.

Figure 10:
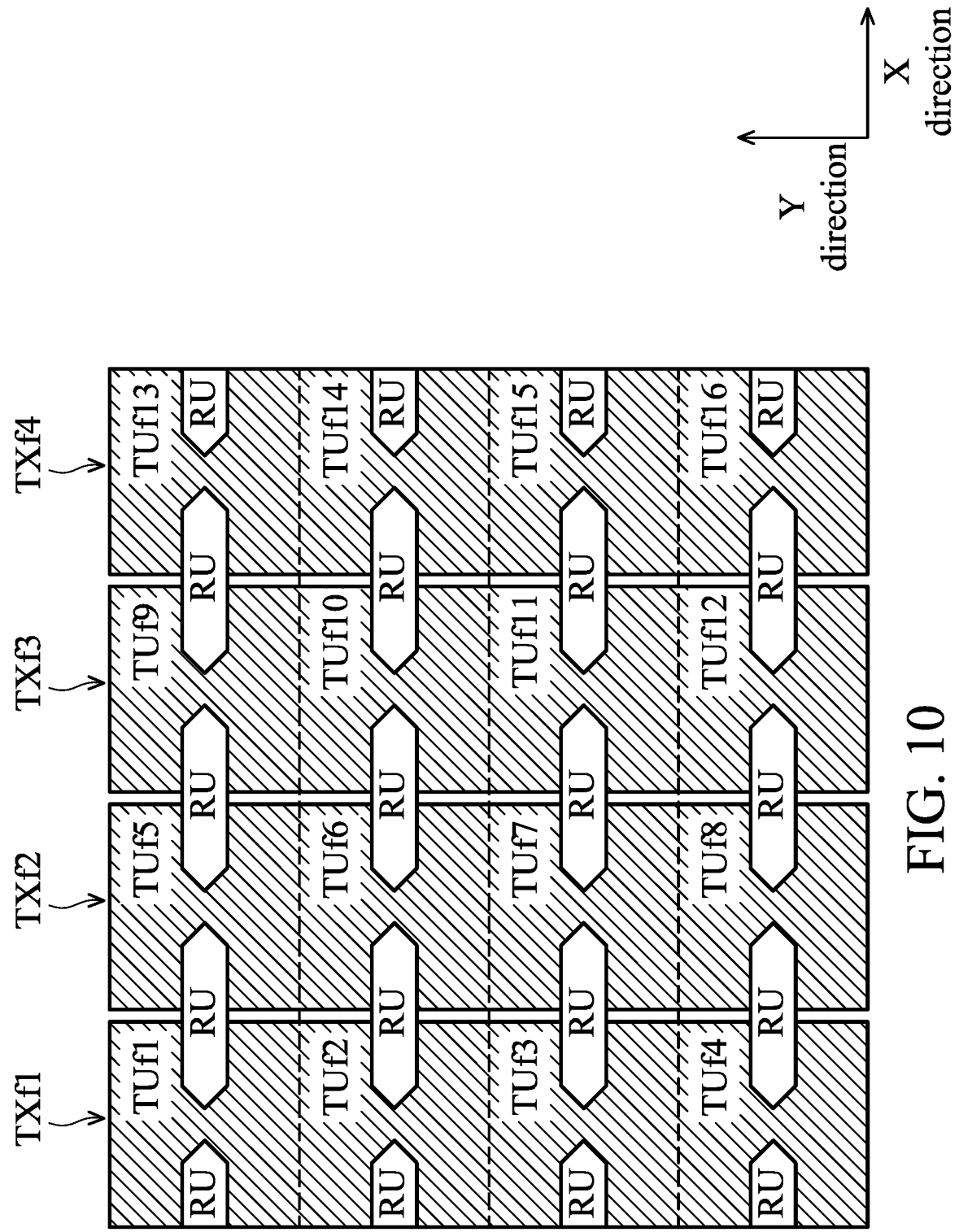
FIG. 10 is a diagram of the second patterned electrodes RXc and the third patterned electrodes TXf.

FIG. 10 is a diagram of the second patterned electrodes RXc and the third patterned electrodes TXf. As shown, the third patterned electrodes TXf1, TXf2, TXf3, and TXf4 can be in the stripe shape extending along the second direction (Y direction) and can be separated from each other by the insulating material. Each electrode portions RU of the second patterned electrodes RXc in the stacking direction of the display panel 100 and the touch panel 200 has the first projecting area on the display panel 100. Each electrode portion TUf1~TUf6 of the third patterned electrodes TXf1, TXf2, TXf3, and TXf4 in the stacking direction of the display panel 100 and the touch panel 200 has the second projecting area on the touch panel 200. The first projecting area and the second projecting area are partially overlapped. In this embodiment, the third patterned electrodes TXf1~TXf4 are sequentially driven by one line at a time, so that the second patterned electrodes RXc perform sensing.

Figure 11:
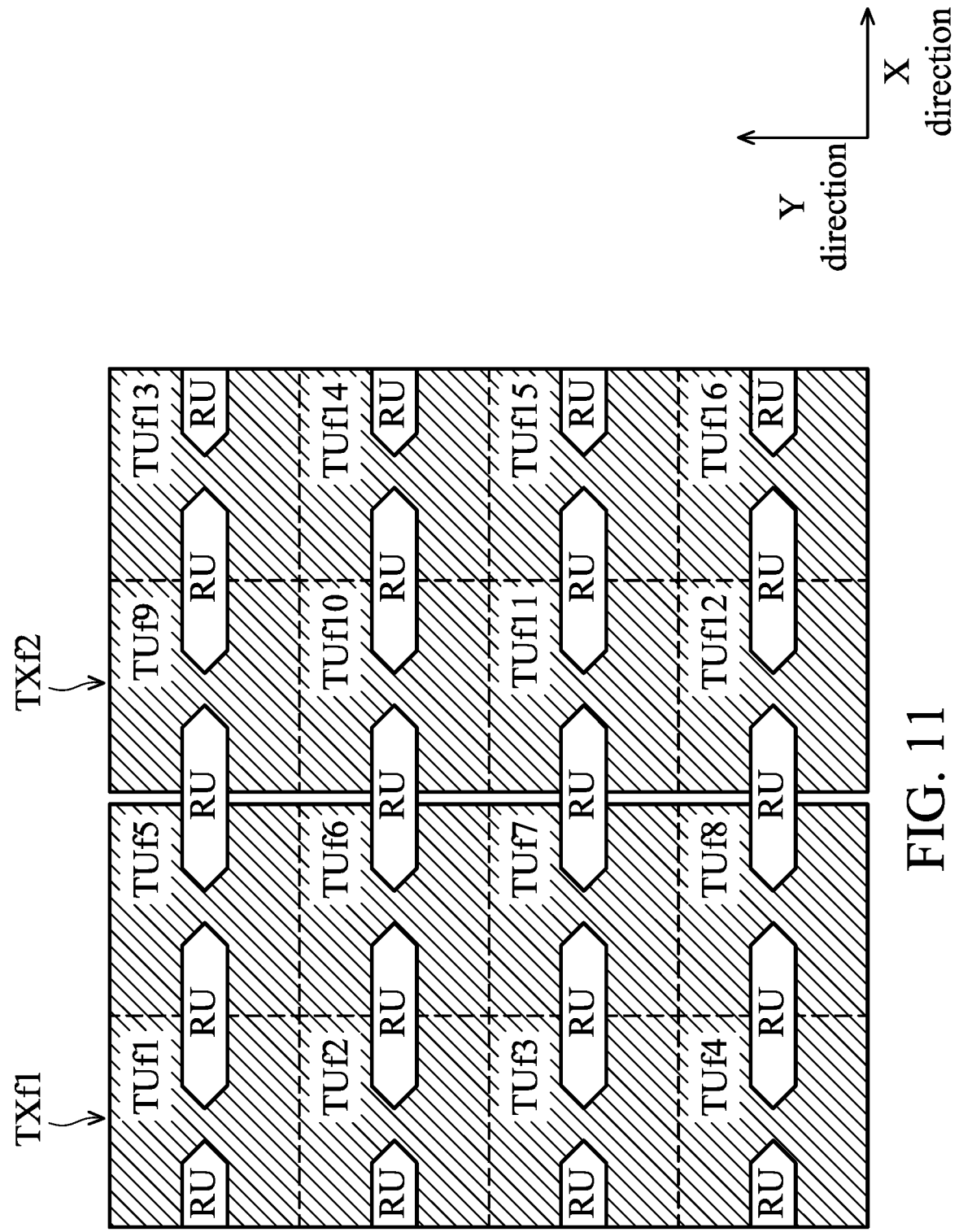
FIG. 11 is another diagram of the second patterned electrodes RXc and the third patterned electrodes TXf.

FIG. 11 is another diagram of the second patterned electrodes RXc and the third patterned electrodes TXf. As shown in figure, the third patterned electrodes TXf1 and TXf2 can be in the stripe shape extending along the second direction (Y direction) and can be separated from each other by the insulating material. Each electrode portions RU of the second patterned electrodes RXc in the stacking direction of the display panel 100 and the touch panel 200 has the first projecting area on the display panel 100. Each electrode portion TUf of the third patterned electrodes TXf1 and TXf2 in the stacking direction of the display panel 100 and the touch panel 200 has the second projecting area on the touch panel 200. The first and second projecting areas are partially overlapped.

In the embodiment of FIG. 1J, the sensing circuit 203B, analog-to-digital converter 204B, and the control signal S3 in FIG. 7 can be omitted. The driving circuit 202 is configured to selectively drive the first patterned electrodes TX or the third patterned electrodes TXf according to the control signal S1 which is output by the microprocessor 201. In the first mode, the driving circuit 202 is configured to drive the first patterned electrodes TX according to the control signal S1 and in the second mode the driving circuit 202 is configured to drive the third patterned electrodes TXf according to the control signal S1. The sensing circuit 203A in the first mode is configured to sense the variance of voltage and charge of the second patterned electrodes RXc according to the control signal S2 which is output by the microprocessor 201 and generate a touch position data by the analog-to-digital converter 204A and send the touch position data to the microprocessor 201 for the following processing. The sensing circuit 203A in the second mode is configured to sense the variance of voltage and charge of the second patterned electrodes RXc according to the control signal S3 which is output by the microprocessor 201 and generate the pressure sensing data by the analog-to-digital converter 204B and send the pressure sensing data to the microprocessor 201 for the following processing. For example, in the first mode, the second patterned electrodes RXc are configured to sense tiny capacitance variations when a stylus or finger touches the touch panel 200, and to transform the capacitance variation into a type of voltage which can be detected by the sensing circuit 203A. In the second mode, the second patterned electrodes RXc are configured to sense the tiny capacitance variation which is generated by the deformation of the touch panel 200 being pressed by the stylus or the finger and transform the capacitance variation into a type of voltage which can be detected by the sensing circuit 203B.

In the embodiment of the invention, the touch sensor structure and the pressure sensor structure of the touch panel 200 have different update rates and report rates. For example, the update rate and report rate of the touch sensor structure can be 100~120 times per second. In some embodiments, the update rate and report rate of the touch sensor structure is greater than the update rate and report rate of the pressure sensor structure.

In the embodiments of the present invention, the sensing data of the touch panel 200 in the first mode and the second mode can be sent to the microprocessor for the following processing. For example, the microprocessor can correlate the sensing data of the first mode and the second mode. In another embodiment, the touch panel 200 in the first mode can sense input when a conductor (such as a finger) touches the touch panel 200 and in the second mode can sense input when a non-conductor (such as gloves) touches the touch panel 200.

What is claimed is:

1. A display touch device, comprising:
   a display panel;
   a touch panel, disposed on one side of the display panel, wherein the touch panel comprises:
   a transparent substrate;
   a plurality of first patterned electrodes, disposed on the transparent substrate in a first direction; and
   a plurality of second patterned electrodes, disposed on the transparent substrate in a second direction, wherein a plurality of mutual capacitors are formed between the first patterned electrodes and the second patterned electrodes, and the first patterned electrodes and the second patterned electrodes form a touch sensor structure; and
   a plurality of third patterned electrodes, disposed on a supporting substrate, wherein the first patterned electrodes partially overlap with the third patterned electrodes in a third direction, or the second patterned electrodes partially overlap with the third patterned electrodes in the third direction to form a pressure sensor structure, wherein the third direction is a stacking direction of the display panel and the touch panel;
   wherein the touch sensor structure performs touch sensing in a first period of a frame and the pressure sensor structure performs pressure sensing in a second period of the frame, wherein the first period does not overlap the second period.

2. The display touch device as claimed in claim 1, wherein the first period is a display period of the frame and the second period is a vertical blanking period of the frame.

3. The display touch device as claimed in claim 2, wherein in the display period, the first patterned electrodes are configured to send a driving signal and the second patterned electrodes are configured to collect the capacitance variation and the third patterned electrodes are coupled to a ground level, and in the vertical blanking period, the first patterned electrodes are configured to send another driving signal and the third patterned electrodes are configured to collect the capacitance variation from the deformation of the touch panel under a pressure and the second patterned electrodes are coupled to the ground level.

4. The display touch device as claimed in claim 3, wherein in the first period, the third patterned electrodes serve as a shielding layer of the second patterned electrodes to prevent interference from the display panel, in the second period, the first patterned electrodes and the second patterned electrodes serve as a shielding layer to prevent interference from the external object.

5. The display touch device as claimed in claim 1, wherein the first period and the second period are in a vertical blanking period of the frame.

6. The display touch device as claimed in claim 1, wherein the supporting substrate is a color filter substrate of the display panel.

7. The display touch device as claimed in claim 1, wherein the supporting substrate is disposed between the display panel and the touch panel.

8. The display touch device as claimed in claim 1, further comprising an insulating layer, wherein the first patterned electrodes and the second patterned electrodes are electrically insulated from each other by the insulating layer.

9. The display touch device as claimed in claim 1, wherein the third patterned electrodes are electrically isolated from each other and a medium layer is between the third patterned electrodes and the first patterned electrodes.

10. The display touch device as claimed in claim 9, wherein the medium layer is an insulating medium layer of oil, air, or glue.

* * * * *